(12) United States Patent
Currid

(10) Patent No.: US 7,509,978 B1
(45) Date of Patent: Mar. 31, 2009

(54) NON-RETURN DEVICE

(75) Inventor: Stephen Currid, Meltham (GB)

(73) Assignee: Hepworth Building Products Limited, Sheffield (GB)

( * ) Notice: Subject to any disclaimer, the term of this patent is extended or adjusted under 35 U.S.C. 154(b) by 0 days.

(21) Appl. No.: 10/089,587

(22) PCT Filed: Dec. 4, 1997

(86) PCT No.: PCT/GB97/03351

§ 371 (c)(1),
(2), (4) Date: Jan. 25, 2005

(87) PCT Pub. No.: WO98/25059

PCT Pub. Date: Jun. 11, 1998

(30) Foreign Application Priority Data

Dec. 4, 1996 (GB) ................................. 9625202.8

(51) Int. Cl.
*F16K 15/14* (2006.01)
(52) U.S. Cl. ...................................... 137/846; 137/850
(58) Field of Classification Search ................ 137/844, 137/846, 850
See application file for complete search history.

(56) References Cited

U.S. PATENT DOCUMENTS 2,662,724 A * 12/1953 Kravagna ..................... 137/847
3,060,882 A * 10/1962 Peters et al. ................. 114/185
3,556,138 A    1/1971 D'Urso
3,967,645 A *  7/1976 Gregory ....................... 137/846
5,460,200 A * 10/1995 Glicksman ................ 137/512.4
6,044,859 A *  4/2000 Davis ......................... 137/15.19

FOREIGN PATENT DOCUMENTS

| BE | 669967 | 1/1966 | |
| FR | 1027609 | 5/1953 | .................. 5/3 |
| FR | 1109095 | 1/1956 | .................. 14/6 |
| GB | 1600743 A * | 10/1981 | |
| GB | 2296309 A * | 6/1996 | |

* cited by examiner

*Primary Examiner*—Kevin L Lee
(74) *Attorney, Agent, or Firm*—Ohlandt, Greeley, Ruggiero & Perle, L.L.P.

(57) ABSTRACT

A non-return device (10) comprises a flat silicone rubber tubing (50) defining a pair of walls (70, 90) which separate to admit fluid in a forward direction but remain together to block fluid flow in a reverse direction. A tubular body (30) surrounds the tubing (50) and comprises an off-set outlet (34) to provide an uninterrupted fluid flow surface for use in a non-vertical orientation. The tubing (50) is mounted on a cartridge (130) which moves axially within the tubular body and compresses the tubing against the tubular body to effect a seal when the device is mounted on an outlet. The tubing (50) provides good operational characteristics and sensitivity as a consequence of having a wall thickness which is 0.3% to 3% of its width.

15 Claims, 3 Drawing Sheets

NON-RETURN DEVICE

SUMMARY OF THE INVENTION

1. Field of the Invention

This invention relates to a non-return device, with particular but not exclusive reference to waste and/or odour traps for domestic and other plumbing.

2. Description of the Related Art

Conventionally, sinks, baths, shower cubicles and the like are provided with waste traps to provide a barrier between the appliance and the waste pipe. These are intended to prevent the escape of unhealthy emissions and unpleasant odours.

The most usual form of waste trap is a bend containing water. Water held in the bend prevents the release of gases and vapours from the waste pipe, whilst permitting passage of water and solids.

Water traps, although simple and effective, have disadvantages; in particular, they occupy a significant amount of space and may be difficult to install and maintain where space is limited. They not infrequently become blocked or dry out and can back-siphon. Moreover, they act as collecting points for undesirable material and even organisms.

In addition to the foregoing disadvantages, conventional water traps do not have the ability to admit air into the waste drainage system. Where such conventional waste traps are used, sinks and baths are known to gurgle. This gurgling results from the waste drainage system struggling to equalize pressure differences within itself as "plugs" of water make their way through its pipework, creating positive pressure in front whilst leaving vacuums in their wakes.

A gurgling sink in its own right may be regarded as mildly irritating; however, once the water from the trap has been sucked out. The bathroom or kitchen is then open to the drain and consequently very smelly, and even dangerous. This is a particular problem with certain types of shared dwelling, where there are long falls of water from sinks, baths, and WCs on a higher floor, generating large pressure changes in the system on lower floors.

Mechanical waste traps have therefore been proposed, mainly with the object of reducing the size required for the waste trap, but also with a view to overcoming the other above-described problems associated with waste traps. Such a mechanical waste trap is described in our earlier United Kingdom Patent Application published as GB 2 296 309. FIG. 1 shows one of the embodiments disclosed in GB 2 296 309.

Referring to FIG. 1, it will be seen that the mechanical non-return device 1 comprises flexible, impervious wall members 7,9 of complementary shapes. These wall members 7,9 are disposed face-to-face in surface contact, so that there is no through passage between them in the normal state. The wall members 7,9 are resiliently urged into the normal state due to the characteristics of the material from which they are formed. An annular cartridge 13 is provided for holding the walls spaced apart from one another at an end of the device to define an inlet 11. The inlet 11 allows the ingress of fluid to the interface of the wall members 7,9. In-flowing fluid will force the members 7,9 apart to permit flow between them from the inlet 11 towards the outlet of the device 1. Flow in the opposite direction is prevented by the close surface contact between the wall members 7,9.

Thus, in a normal state, the mutually contacting wall members 7,9 prevent flow between them towards the inlet, but fluids entering the inlet can force the wall members apart and flow between them.

Whilst this known water trap has proved highly effective. The present invention sets out to provide additional advantages to those already existent in such a device.

SUMMARY OF THE INVENTION

According to a first aspect of the invention, there is provided a non-return device comprising:

flexible impervious wall members of complementary shapes disposed face-to-face in surface contact so that there is no through passage between them in their normal state and resiliently urged into the said normal state; and means holding the said walls spaced from one another at an end of the device to define an inlet for ingress of fluid to the interface of said members, whereby in-flowing fluid will force the said members apart to permit flow between them from the inlet and the other end of the device, whereas fluid flow in the opposite direction is prevented by the close surface contact between the members;

wherein the device comprises a tubular body portion surrounding the wall members and a tubular outlet portion extending from an outlet end of the body portion and having a different diameter therefrom, the longitudinal axis of the tubular body portion and the longitudinal axis of the tubular outlet portion being mutually radially offset, so that a wall portion of the body portion is radially congruous with a wall portion of the outlet portion, so as to define a generally uninterrupted flow surface for discharging fluid.

In a preferred embodiment, the outlet portion has a smaller diameter than the body portion. The two may be joined by an intermediate portion which tapers from the body portion down to the outlet portion. By such an arrangement, the device can accommodate wall members having dimensions that provide a desired flow characteristic, whilst the outlet portion can be directly connected to a fitting having a smaller diameter than that of the body portion. This removes the need for an adapter between the device and the fitting, yet provides an uninterrupted surface for discharging fluid to flow over, thereby preserving the best possible flow characteristics and avoiding the collection of debris or stagnant water.

Preferred features of this aspect of the invention are set out in claims 2 to 4.

According to a second aspect of the invention, there is provided a non-return device comprising:

flexible impervious wall members of complementary shapes disposed face-to-face in surface contact, so that there is no through passage between them in a normal state and resiliently urged into the said normal state; and means holding said wall spaced apart from one another at an end of the device to define an inlet for ingress of fluid to the interface of said members, whereby in-flowing fluid will force said members apart to permit flow between them from the inlet and to the other end of the device, whereas fluid flow in the opposite direction is prevented by the close surface contact between the members;

wherein the device comprises a tubular body portion surrounding the wall members and means are provided for compressing a portion of the wall members situated in a region adjacent the inlet against the said means holding the walls spaced apart from one another and/or compressing said portion of the wall members against the said tubular body portion as the device is attached to a fluid-supplying component, so as to provide a seal.

By such an arrangement sealing between the walls and the means holding them apart, the forward flow path can be automatically sealed simply by mounting the device on the pipe. When a seal is effected between the tubular body and the walls, such a mounting operation can effect a seal in the back-flow direction. This is particularly beneficial when installing the device in a constricted space.

Preferably, the means holding the walls spaced apart from one another is axially movable relative to the body portion, so as to enable the compression of the wall members therebetween. Preferably, the means holding the walls spaced apart is in the form of an annular sleeve which is located coaxially within the tubular body portion. Preferably, the annular sleeve has an end face which is adapted to abut the end of a component to which the device is to be attached, thereby experiencing an axial displacement relative to the body portion, as the body portion is axially drawn towards the component during attachment thereto. Preferably, the end face comprises a compression seal, so as to effect a seal between the component and the said inlet upon mounting. In one particularly preferred embodiment, the sleeve is provided at an axial inlet end of the body portion and surrounded by a nut, which can be screwed on to a component to which the device is to be fitted, thereby drawing the body portion axially towards the component in the desired manner. Such a preferred embodiment enables the device to be installed quickly and efficiently, using only one hand. Furthermore, the device can easily be demounted.

Preferred features of this aspect of the invention are set out in claims 5 to 10.

According to a third aspect of the invention. A non-return device comprises:
flexible impervious wall members of complementary shapes disposed face-to-face in surface contact so that there is no through passage between them in their normal state and resiliently urged into the normal state; and
means holding the said walls spaced apart from one another at an end of the device to define an inlet for ingress of fluid to the interface of said members, whereby in-flowing fluid will force said members apart to permit flow between them from the inlet and to the other end of the device, whereas flow in the opposite direction is prevented by the close surface contact between the members; wherein the thickness of the wall members is in the range of 0.3% to 3% of their width, the said width being measured in a direction transverse to the forward fluid flow direction.

It has been found that this relationship enables the device to pass even a very light amount of fluid. whilst maintaining an effective barrier against reverse fluid flow. In fact, the fluid need not comprise a liquid; the device can be sensitive enough to control flows of fluid which comprise solely or predominantly air.

Preferred features of this aspect of the invention are set out in claims 1 to 13.

The above-described and other features and advantages of the present disclosure will be appreciated and understood by those skilled in the art from the following detailed description and drawings.

DESCRIPTION OF THE PREFERRED EMBODIMENTS

Figure 1:
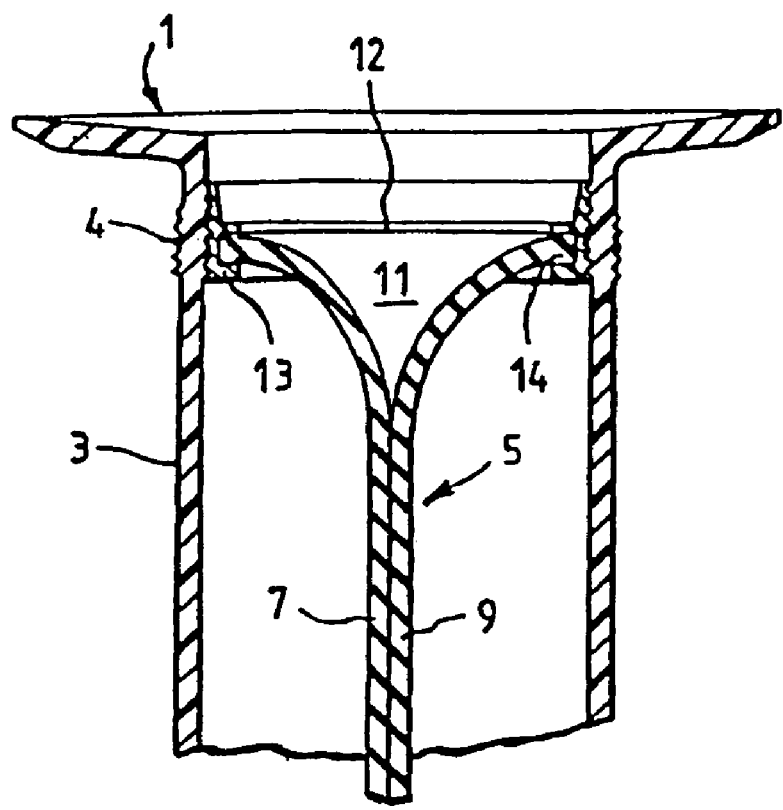
FIG. 1 shows an example of a non-return device according to the prior art.
Figures 2, 2A:
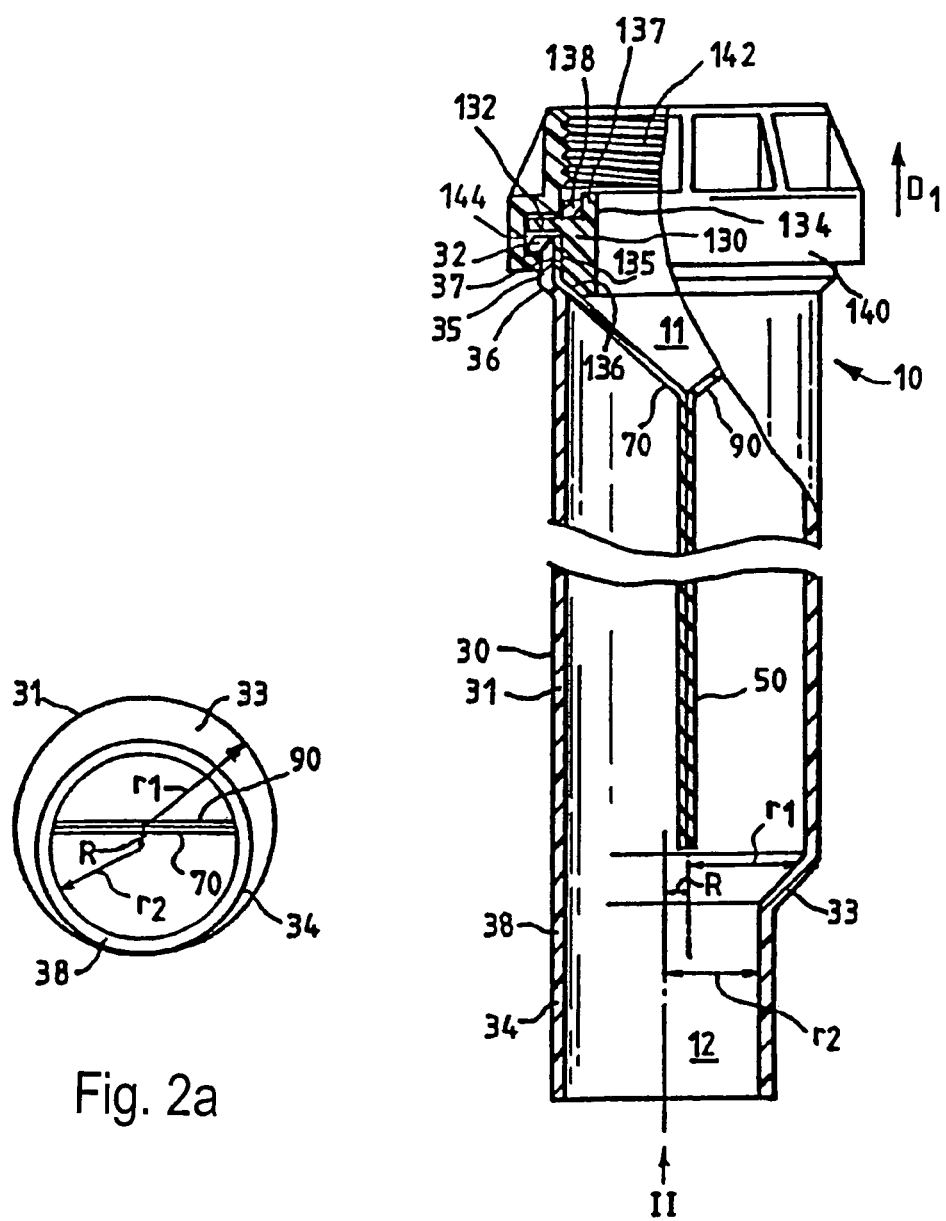
FIG. 2 shows an embodiment of the invention.
FIG. 2a is an end view as seen from the direction 11 in FIG. 2.
Figure 3:
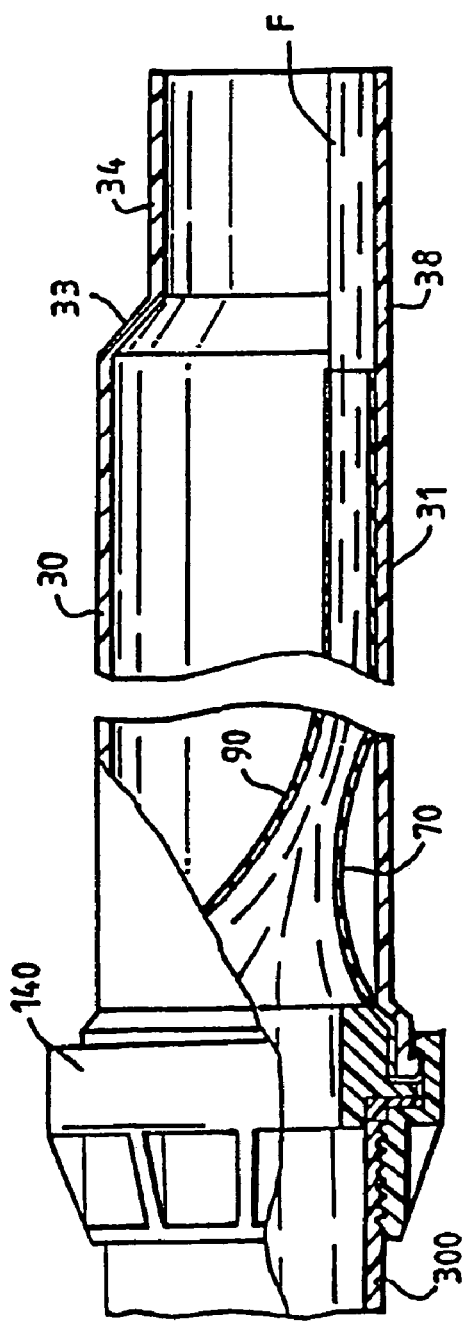
FIG. 3 shows the embodiment of FIG. 2 in use, in a horizontally aligned position.

FIGS. 2 and 3 show in vertical cross-section a first non-return device embodying the invention. From these figures, it will be seen that the device has general similarity with the prior art device of FIG. 1. A thin-walled lie-flat elastomeric tube 50 is located inside a pipe 30. The tube 50 comprises two opposite flat walls 70, 90 which are connected to each other, with sharp creases where the flat walls meet, extending along the length of the tube. The tube is manufactured in such a way that, in its normal relaxed state, the opposite flat walls 70, 90 lie in face-to-face contact with one another at a light pressure, due to the resilience of the material of the tube 50.

The lie-flat tubing 50 is made from silicone rubber and has a wall thickness of 0.28 mm. The walls have a width (measured in a direction perpendicular to the page in FIG. 2) of 44 mm. The tubing should be resistant to temperatures of less than 0° C. and up to 100° C. It should also be chemically resistance to acids and alkalis and general household solvents, cleaning agents, oils and fats, in particular.

Different widths and thicknesses of the lie-flat tubing may be used, if desired. Varying the wall thickness and/or the width will have a significant effect upon the fluid flow rate through the tubing. It has been found that, in order to provide suitable fluid flow characteristics, the thickness should be not less than 0.003 (or 0.3%) of the flat width of the tubing and also not more than 0.03 (or 3%) of the flat width. It has been found that very good results are achieved where the thickness of the walls is in the range of 0.5% to 2.5% of their width, with exceptionally good results being achieved in the range of 1% to 2% of their width. If the thickness is less than 0.3% of the flat width, the tubing does not adequately resist back-flow. If the thickness exceeds 3% of the flat width, it has been found that the ability of the device to allow forward-flow of fluid lacks sensitivity. On the other hand, tubing which does fall within the specified range has been found to yield excellent results, in that the tubing can be sensitive enough to operate successfully with gaseous fluids (i.e., in the absence of a liquid). This characteristic yields significant benefits because the device then has the ability to admit air into the waste drainage system, thereby overcoming the gurgling described above.

Table 1 below shows the flow rates achieved with various examples of lie-flat tubing at a constant rubber hardness.

TABLE 1

| Width | Flow Rate (L/Minute) | Wall Thickness | W/T |
|---|---|---|---|
| 38 | 36.S | 0.32 | 118.75 |
| 38 | 38.2 | 0.33 | 115.15 |
| 38.3 | 35.74 | 0.62 | 61.77 |
| 38.7 | 38.09 | 0.64 | 60.47 |
| 39.3 | 40.38 | 0.65 | 60.46 |
| 43.9 | 55.26 | 0.28 | 156.79 |
| 44.52 | 48.2 | 0.6 | 74.20 |
| 44 | 60 | 0.12 | 366.67 |

At the upper end of the tubing 50, the walls 70,90 are held apart from each other, so as to define an inlet region 11 with a circular inlet opening. This is achieved by stretching the tubing 50 over the radially outer wall 135 of a generally annular cartridge 130. The cartridge 130 comprises a radially-outwardly facing frusto-conical surface 136, over which the tubing 50 extends. The part of the cartridge 130 which supports the tubing 50 is received within a mouth 35 of a housing 30, which surrounds the tubing 50 and defines a waste pipe. The mouth 35 has an internal profile which corresponds with the radially outer configuration of the cartridge 130 that addresses it. In this regard, the mouth comprises a radially inwardly facing surface 37 and an inwardly directed frusto—conical surface 36. The cartridge 130 is axially movable within the mouth 35. The cartridge 130 also comprises a radially outwardly extending flange 130, which seats upon and abuts an axially facing end surface of the mouth, which is defined by a further radially-outwardly facing flange 32. The two flanges are received within an annular recess 144 of a nut 140. As is common, the nut 140 is provided with a threaded mouth 142. An annular sealing ring 138 is situated on the cartridge 130, so as to face in the axial direction into the mouth of the nut 140. The sealing ring 138 is held in place by location about an axial flange 137 of the cartridge 130. The tubing SO, the cartridge 130, the housing 30, the nut 140 and the seal 138 are all substantially coaxial.

The device 10 is installed upon a waste outlet 300 by screwing the nut 140 onto a correspondingly threaded outer surface of the waste outlet (see FIG. 3). This action serves to move the nut 140 in the direction D1 shown in FIG. 2. This movement pulls the housing 30, the cartridge 130 and hence the tubing 50 in the same direction, by virtue of the location of the flanges 132 within the annular recess 144 of the nut 140. After the nut 140 has reached a certain point, an axial end of the waste outlet will abut the seal 138. As the nut 140 is turned further, the housing 30 will continue to travel in the direction D1, urging the cartridge 130 still further in that direction by virtue of the co-operation of the flanges 132 and 32. This will compress sealing ring 138, effecting a first seal between the waste outlet 300 and the cartridge 130. This compression will significantly resist the further movement of the cartridge 130 in the direction D1. However, as the nut 140 is turned still further, the housing 30 will still be urged in the direction D1. This will then cause the tubing 50 to be compressed between the frusto-conical surface 136 provided on the cartridge 130 and the correspondingly configured inwardly-facing frusto-conical surface 36 provided on the housing 30. This will effect a second compression seal between the cartridge 130 and the housing 30.

The effect of this sealing arrangement is that a first compression seal 138 provides a seal in the forward direction and constrains waste fluid to flow between the walls 70 and 90. The effect of the second compression seal serves to prevent back-flowing fluid from escaping between the walls of the cartridge 130 and the housing 30. This sealing arrangement has the significant advantage that the seals are brought into effect by the act of mounting the device upon the waste outlet 300. Because of the provision of the nut 140, the whole device can be mounted on the waste outlet with ease and, in many cases, using a single hand.

As can be seen from FIGS. 2 and 3, the housing 30 comprises a main tubular section 31 which has a circular cross-section and an outlet tubular section 34, which also has a circular cross-section. The main tubular section 31 has a radius $r_1$ and the outlet section 34 has a different, smaller radius $r_2$. The longitudinal axes of the main section 31 and the outlet section 34 are offset by a distance R. The relationship between these dimensions is as follows:

$$R = r_1 - r_2.$$

By this arrangement, the walls of the main section 31 and the outlet section 34 are mutually congruent in one side region 38. This configuration enables the device to be used with particular efficiency in orientations other than the vertical orientation shown in FIG. 2.

Referring to FIG. 3, the device is shown in use in a horizontally aligned position. From this figure, it will be seen that the congruent nature of the main body portion 31 and the outlet portion 34 provides a smooth, uninterrupted surface over which the out-flowing fluid F can flow. This arrangement reduces the risk of debris collecting in the bottom of the device.

Figure 4:
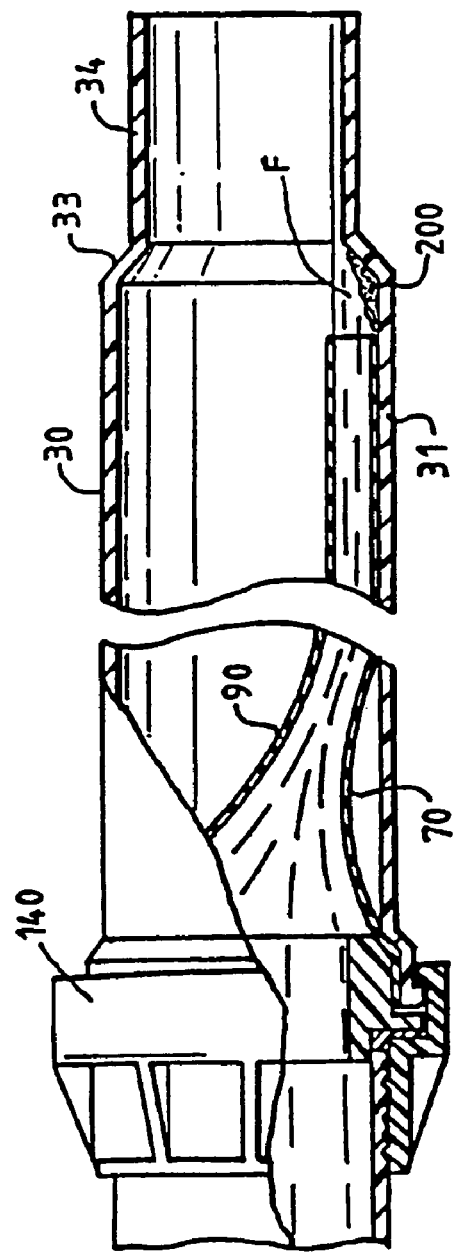
FIG. 4 shows a variation of the embodiment of FIG. 3 in a corresponding condition.

For comparison, FIG. 4 shows an embodiment of the invention in which the outlet portion 34 is concentric with the main body portion 31. Here it can be seen that the junction between the outlet portion 34 and the main body portion 31 presents an obstacle to the out-flowing fluid F. This leads to significant problems. First, the shoulder 33 provides an obstacle to the fluid flow, thereby causing turbulence and degrading the fluid flow characteristic. Second, the shoulder 33 provides a region in which debris 200 can collect and stagnate. Although the odours arising from this should normally be constrained by the sealing effect of the device, this situation is still undesirable. Furthermore, if the amount of debris 200 builds up beyond a certain level, it can actually block the outlet of the tubing 50, thereby seriously interrupting fluid flow, or even enter between the walls of the tubing 50, thereby preventing adequate closure and thereby destroying the sealing effect of the tubing 50 in extreme cases.

The wall 33 which defines a junction between the outlet portion 34 and the main body portion 31 is, in this case, inclined. However, a substantially radial wall could be included instead, for example.

The configuration of the body portions enables the outlet portion 34 to be tailored to fit with a relatively small diameter pipe, without the need for an adaptor. At the same time, the diameter of the body portion 30 can be maintained at a relatively large size, so as to enable effective operation of the tubing SO and desired fluid flow characteristics to be met, all of this being achieved in a configuration that can be used in orientations other than the vertical.

Although the first, second and third aspects of the invention are all disclosed herein in a single embodiment, each is essentially independent: that is to say only one or two of them could be beneficially included in a non-return device without the remainder.

Many further modifications and variations will suggest themselves to those versed in the art upon making reference to the foregoing description, which is given by way of example only and which is not intended to limit the scope of protection, that being determined by the appended claims.

The invention claimed is:

1. A non-return device for use between a waste outlet and a waste pipe in a plumbing system; the device comprising:
 a tubular housing, for connection between the waste outlet and the waste pipe;
 flexible, impervious wall members disposed within the housing for communication with the waste outlet at a first, upstream, end of the housing, the flexible, impervious wall members being of complementary shapes disposed face-to-face in surface contact, so that there is no through passage between them in a normal state and resiliently urged into the normal state;
 support means comprising an annular sleeve having a first part located coaxially within said housing at an axial inlet end thereof, and a second part projecting axially from said housing and comprising a radial flange, the first part of said annular sleeve being arranged to hold said wall members spaced apart from one another at the first end thereof to define an inlet for fluid, thereby enabling it to reach the interface of said members, whereby in-flowing fluid can force said members apart to permit flow between them from the waste outlet and to the other end of the device, whereas flow in the opposite direction is prevented by the close surface contact between the members; and a nut for mounting the device upon the waste outlet, said nut comprising an annular recess, which recess surrounds the second part of the annular sleeve and receives the flange therein in such a manner as to permit axial movement thereof within the recess;

wherein the arrangement is such that mounting of the nut upon the waste outlet causes axial movement of the flange within the annular recess, so as to compress a portion of the wall members situated in a region adjacent the inlet against the support means and also compress the portion of the wall members against the housing and thereby effect a seal between the support means and the housing.

2. A non-return device according to claim 1, wherein the tubular housing is provided with a tubular main portion and a tubular outlet portion for connection to the waste pipe, the tubular outlet portion having a different diameter from the tubular main portion, the longitudinal axis of the tubular main portion and the longitudinal axis of the tubular outlet portion being mutually radially offset, so that a wall portion of the tubular main portion is radially congruous with a wall portion of the tubular outlet portion, so as to define a generally uninterrupted flow surface for discharging fluid.

3. A non-return device according to claim 1, wherein the outlet portion has a smaller diameter than the housing.

4. A non-return device according to claim 1, wherein the housing and the outlet portion are joined by an intermediate portion, which is tapered.

5. A non-return device according to claim 1, wherein the housing has a circular cross-section having a radius $r_1$ and the outlet portion has a circular cross-section having a radius $r_2$, the two radii being radially offset by a distance R; wherein $R=r_1-r_2$.

6. A non-return device according to claim 1, wherein the annular sleeve has an end face which is adapted to abut the end of a component to which the device is to be attached, thereby experiencing an axial displacement relative to the body portion, as the body portion is axially drawn towards the component during attachment thereto.

7. A non-return device according to claim 6, wherein the end face comprises a compression seal, so as to effect a seal between the component and the inlet upon mounting.

8. A non-return device for use between a waste outlet and a waste pipe in a plumbing system;

the device comprising a tubular housing, for connection between the waste outlet and the waste pipe;

flexible, impervious wall members disposed within the housing for communication with the waste outlet at a first, upstream, end of the housing, the flexible, impervious wall members being of complementary shapes and disposed face-to-face in surface contact so that there is no through passage between them in their normal state and resiliently urged into the normal state; and a support that holds the wall members spaced apart from one another at the first end thereof to define an inlet for fluid thereby enabling it to reach the interface of said members, whereby in-flowing fluid will force said members apart to permit flow between them from the waste outlet and to the other end of the device, whereas flow in the opposite direction is prevented by the close surface contact between the members; wherein the thickness of the wall members is in the range of 0.3% to 3% of their width, the width being measured in a direction transverse to the forward fluid flow direction.

9. A non-return device according to claim 8 wherein the thickness of the wall members is in the range of 0.5% to 2.5% of their width.

10. A non-return device according to claim 9, wherein the thickness of the wall members is in the range of 1% to 2% of their width.

11. A non-return device according to claim 8 wherein a radius of said tubular housing is smaller at a downstream end thereof than at said upstream end.

12. A non-return device according to claim 8, wherein the tubular housing is provided with a tubular main portion and a tubular outlet portion for connection to the waste pipe, the tubular outlet portion having a different diameter from the tubular main portion, the longitudinal axis of the tubular main portion and the longitudinal axis of the tubular outlet portion being mutually radially offset, so that a wall portion of the tubular main portion is radially congruous with a wall portion of the tubular outlet portion, so as to define a generally uninterrupted flow surface for discharging fluid.

13. A non-return device according to claim 12, wherein the outlet portion has a smaller diameter than the housing.

14. A non-return device according to claim 12, wherein the housing and the outlet portion are joined by an intermediate portion, which is tapered.

15. A non-return device according to claim 12, wherein the housing has a circular cross-section having a radius $r_1$ and the outlet portion has a circular cross-section having a radius $r_2$, the two radii being radially offset by a distance R; wherein $R=r_1-r_2$.

* * * * *